INVENTOR
Jacob Rabinow

BY Joseph A. Genovese
ATTORNEY

INVENTOR
Jacob Rabinow

BY Joseph A. Genovese
ATTORNEY

INVENTOR
Jacob Rabinow
BY Joseph A. Genovese
ATTORNEY

INVENTOR

Jacob Rabinow

BY Joseph A. Genovese

ATTORNEY

INVENTOR
Jacob Rabinow

BY Joseph A. Genovese
ATTORNEY 3,496,542
Patented Feb. 17, 1970

1

3,496,542

MULTIFONT CHARACTER READING MACHINE

Jacob Rabinow, Bethesda, Md., assignor to Control Data Corporation, Rockville, Md.

Filed Oct. 27, 1966, Ser. No. 590,028
Int. Cl. G06k 9/12
U.S. Cl. 340—146.3 4 Claims

ABSTRACT OF THE DISCLOSURE

Optical character recognition machine of the type using character standards to which scanner-extracted information is compared, wherein the standards are provided with logic circuits having the effect of expanding and compressing the standards to conform to size variations in the characters as printed. The logic circuits are arranged to require only a threshold fulfillment in certain portions of the characters and to demand absolute fulfillment for more significant portions of the characters.

This invention relates to optical character recognition machines and particularly to machines having a multifont recognition capability.

As the art has developed and optical character reading machines became more widely used, the need for a reasonably simple, multifont reading machine became increasingly apparent and acute. Single font reading machines have a definite place in commerce, however, machines with a multifont capability are far more desirable for obvious reasons. Multifont reading machines have been proposed and some have been constructed. All machines capable of identifying handwritten characters can be considered as multifont machines. For the most part these machines rely on curve tracing techniques or techniques analogous to curve tracing. Unfortunately such machines are inherently expensive and complicated. Further, that class of machine experiences great difficulties peculiar to the class and known to those skilled in this art.

The brute force approach to multifont reading machines has been tried with some success. I consider this approach to be tantamount to a plurality of separate reading machines operating in parallel from one scanner, and having individual (or substantially individual), character standards for each character of every font that the machine is capable of identifying. Granted certain character standards can be partially or fully shared, the extent to which this has been done is not particularly significant. Furthermore, by greatly increasing the number of character standards so as to provide a multifont capability, ultimate recognition of each character becomes more difficult. In other words, it is considerably easier for a machine to identify a scanned character when that character must be one of a given small number, say 36, than it is to select the same scanned character from 500 or 1,000 possibilities. When separate character standards are built into a machine for each possible character of a multifont machine, to my knowledge the possible characters of the various fonts are treated as separate characters. In other words, a small "2" and a a large "2" are treated as separate characters although the "2's" may be geometrically similar.

The above approach to multifont reading machine design applies to a number of classes of machines such as optical mask comparison machines, feature analysis machines, and area correlation machines. While feature analysis machines and optical mask machines possess certain advantages, my present invention is more concerned with the area correlation type machine. For multifont reading at high speed, the area correlation approach

2 or combination of area correlation and feature analysis, appear to me to be the most promising at this stage in the development of the art. Accordingly, the following discussion of my invention is primarily concerned with area correlation machines utilizing electronic masks as character standards. An electronic mask is the character standard or character criterion to which a scanned character is compared to arrive at the identity of the character. In the ordinary correlation machine at least one mask is required for each character which the machine is capable of identifying although certain electronic mask sharing can be practiced, particularly when the masks are constructed as representative of features or portions of characters. This applies to the electronic mask used in feature analysis machines and my invention may be applied thereto with equal facility.

Electronic masks are constructed in a variety of ways. The mask may be an electronic tree such as an arrangement of flip-flops to form the tree. Another way to form an electronic mask is by using gates representative of features. Still another way to construct an electronic mask is to arrange passive elements such as magnetic cores or resistors in a manner such that they will logically combine elements, groups of elements, or features and develop a match voltage or current signal reflecting the correlation between a scanned character and the mask as designed. It has been the practice in the past to construct the electronic masks as nearly as possible to be representative of the character which the masks represent. For instance, as disclosed in U.S. Patent No. 3,104,369, the electronic masks are constructed of resistor adders whose inputs are extracted from a temporary storage device (a shift register) in which data corresponding to the "black" and "white" elements of an examined area are stored. If a scanned character does not match such a mask well, the correlation signal is obviously low. Thus, prior electronic masks operated very well with the characters for which the masks were explicitly and narrowly designed. When such machines are faced with deviations in fonts, the majority of the characters are rejected. Font deviations as discussed here pertain to variations in style and size, and perfectly similar characters of different sizes cannot be identified by such machines.

It occurred to me that an electronic mask which was made to automatically shrink and grow and/or shrink and grow in selected portions thereof to suit each of the characters being examined would be an ideal solution to the above problems and difficulties. While my invention does not provide a mask capable of so automatically shrinking and growing to suit multifont reading tasks, my invention accomplished, in a major way, the same effect and therefor one way to consider the accomplishment of my invention is to visualize an electronic mask whose sensitive area contracts and grows to substantially fit the characters of numerous fonts.

As an aid to understanding my invention, consider typical electronic masks such as in U.S. Patent No. 3,104,369 which are made of resistor adders having inputs connected to selected stages of a shift register serving as the temporary storage for the data extracted by a scanner from a character area. While the shift register can be arranged as one long string of shift register stages, it is simpler and easier to visualize a shift register arranged on $x$–$y$ coordinates so that the data representing the scanned character is arranged in an $x$–$y$ grid to form an "electronic image" of the scanned character. When visualized in this manner, the electronic mask resistor connection-points with the register are along the centerline and within the outline of the character which the mask represents. Now, many reading machines and certainly those reading machines designed to read poor print and several fonts, have a resolution such that the electronic image in the register will cover two, three and even as many as five elements in width (transverse to or across the line forming the character). This presents a dilemma to the designer, with the dilemma being the choice of selection of stages of the shift register within the broad general outline of the electronic image of the character. The designer can select those shift register stages along the centerline of the expected character which would mean, in effect, that the electronic mask is very thin. A printed character which deviates only slightly in style (change in font) will not match such a mask, or will match it poorly. A character which is only slightly smaller or slightly larger, but of identical style, will match such a mask very poorly. On the other hand, the designer may select as resistor connection points, many stages in the register along the general outline of the expected character. In effect, this would constitute a broad or wide mask, and a thin character will satisfy the mask very poorly. The reason for this poor satisfaction of the mask is that an ordinary resistor adder mask demands that all of the elemental points thereof be satisfied (contain "black" information) otherwise the match voltage signal provided by the mask will be correspondingly reduced. Thus, we have a situation where a perfectly formed character is fitted in its entirety within the mask but owing to the design of the mask the correlation signal is low.

In the design of my present electronic mask I use the broad area of the general outline of the expected area of the character, and for convenience of description let us assume that my mask is composed as a resistor adder would be composed, in the sense that if the register stores data corresponding to "black" in a given elemental area, the electronic mask detects this and considers that elemental area satisfied. (I will discuss negations or expected "white" areas as described in Patent No. 3,104,369 later.) With a broad mask or a mask which is broadened in certain selected regions and not others, I have associated logical means by which a single bit of data falling within a group of elements of the mask is considered equally and identically with two, three or more bits of information falling within the same group. Now, by arranging the groups which are so logically considered transversely across the character outline of the mask, that is, the outline representative of the character which the mask is designed, I provide tolerance for numerous fonts of the same character with font differences defined as changes in size of the character, changes in the shape of the character, and changes in thickness of the printed lines which form the characters. It is essential for an understanding of my invention to understand that I logically combine selected groups of stages forming elements of the electronic mask in a manner such that I obtain a single output of the same value as long as just one stage of that group temporarily stores data corresponding to a portion of the scanned character. Thus it makes no difference whether a line portion of the scanned character is thin, broad, barely fits within the group of elements, partially fits within the group of elements, is slanted one way or the other, etc. The output signals from this group of stages, i.e. the signal which my logical combination yields, will be the same. One of the simplest methods of obtaining such a logical combination is to use an OR gate whose inputs are connected to those stages of the shift register representing the above mentioned group of elemental areas. The output of the OR gate then can be processed in various ways by the decision section of the reading machine. One way is to use a set of AND gates there being one AND gate for each character that the machine can identify. Another way is to use a comparator, such being replete in this art. Another way is to combine a plurality of the outputs of the several AND gates to represent features and then use a logic tree, or alternatively, select various OR gate outputs and arrange them in a logic tree configuration. In the ordinary AND gate decision suggested above, an advantage of my invention is visualized. A single AND gate for a given character will be used for a large group of the fonts, while in prior machines of which I am aware, each variation of a single character would have it own ultimate-decision AND gate.

While logical OR gating whose inputs are extracted from stages transversely across the character-representative portion of the electronic mask, provides a wide latitude for acceptance of multi-font characters without suffering degradation losses as described above in connection with prior electronic mask machines, I prefer to use AND and OR circuits in handling the negations that form a portion of my electronic msak. The term "negation" is described in Patent No. 3,104,369 and for my present purposes it can be considered either as the not-function of "black," or as selected portions of the character background. By using AND circuitry for an area of negation elements, the AND circuits have the effect of demanding a portion of the character background to appear at a specific location on the electronic mask. To overcome certain practical difficulties experienced in reading tasks, I may superimpose a further logical requirement on the negation area or, more properly, the stages representing elemental areas making up the entire negation area of the mask. For example, the elemental areas can be visualized as formed in adjacent columns or rows, and the logical network (OR gates) superimposed on the AND gating can require that any two or any three adjacent rows or columns (of more than three rows or columns making up the entire negation area) experience the character background ("white") before yielding a negation signal demanded by the decision section of the reading machine.

The above explanation was given in terms of, or with the background of, a conventional reading machine using a shift register as a temporary storage device for the scanner-extracted information. For that reason, and that reason only, I refer to stages of a shift register. The shift register happens to be a very convenient device to which the elements making up the electronic mask are connected, however, it has certain drawbacks. The first is its cost, the second is the time required to shift the data through the register, and another is that the data entering the shift register must be quantized. While I have been informed that there are such things as analog shift registers, the only shift registers that are commonly used are digital devices. Since my invention is concerned with a reading machine with multifont capability brought about by unique electronic masks forming the character standards, I will disclose later how I can construct such multifont machines which have no temporary storage device. Furthermore, I have selected a fully analog embodiment to show this possibility. In machines which have no temporary storage device in the sense of a shift register or the equivalent, the electronic masks in accordance with my invention can be made by logical connections with the photocell amplifiers of a mosaic scanner, thus the selection of elements forming individual groups transversely across the outline of the character which the mask represents, corresponds exactly to the described selection of stages of the shift register discussed above.

An object of my invention is to provide a reading machine having a multifont capability, wherein the reading machine has electronic masks constructed in any one or combination of methods discussed before with the result that many variations (changes of font) of the same character will completely satisfy the requirements established by the electronic mask.

Another object of my invention is to accomplish the above by simple means, for instance, by logical OR connections of groups of elements making up the mask, where the groups of elements are arranged in any selected manner to satisfy the requirements imposed on the machine by the designer. In many cases the groups of elements will be arranged transverse to the outline of the mask which represents the character for which the mask is designed. This is not a rigid requirement. In some instances it may be desirable to logically connect a group of elements of the mask which run in a direction other than transverse to the character outline.

A further object of my invention is to provide a reading machine, particularly of the area correlation type or of a type related to or analogous to area correlation, with a multifont capability in an effectual and economical manner. While it is often alleged that an invention accomplishes something in an economical manner, in my case I am unaware of a multifont reading machine of the general class mentioned immediately above, which can be constructed in an economical fashion. I realize that this is a relative term. I have had multifont area correlation reading machines constructed and successfuly used. However, these used the mask-duplication method. Where there was some mask sharing or some mask combination arrangements for the most part every character and every variation of each character (with few exceptions) had to have its own character standard. One of the important features of my invention is that one electronic mask constructed as disclosed herein will be fully and completely satisfied by numerous variations of the same character.

Other objects and features will become apparent in following the description of the illustrated forms of the invention which are given by way of example only.

Figure 1:
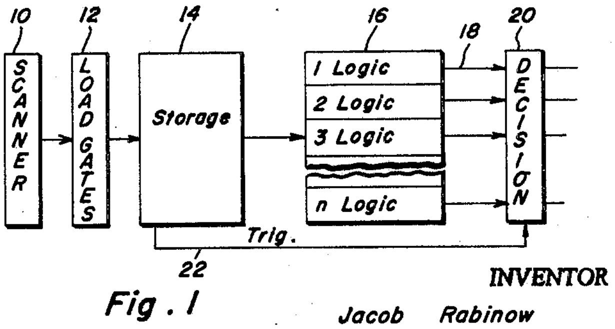
FIGURE 1 is a diagrammatic view showing the subassemblies of a typical reading machine.

The block diagram of FIGURE 1 shows the interconnection of major sub-assemblies for one embodiment of a reading machine constructed in accordance with the invention. These sub-assemblies include a scanner 10 to extract information from a character and its background. The information is loaded by gates 12 into storage device

14 which can assume any conventional configuration. A data processor 16 is operatively connected with storage device 14. Signals from the data processor 16 are conducted on lines 18 to the decision section 20 of the reading machine which is triggered by a signal on line 22 at the proper time, e.g. as disclosed in numerous prior patents, such as Patent No. 3,104,369. In the first illustrated embodiment of my invention (FIGURES 1–6) the data processor 16 in conjunction with storage device 14 and decision circuitry 20, constitutes an important aspect of my invention. In FIGURE 1 the data processor is designated "1 logic," "2 logic," . . . "*n* logic" to imply separate electronic masks for the characters 1, 2, . . . *n*. The embodiment of FIGURES 7–11 has a group of electronic masks, however, they are formed in a manner different from the formation of the masks in the embodiment of FIGURES 1–6. These distinctions will be discussed, however, it can be noted that one embodiment (FIGURES 1–6) employs a digital treatment of data, while the other embodiment is fully analog.

FIGURES 1–6

Using prior art such as the Rabinow et al. U.S. Patent No. 3,104,369 as background information, we can assume that storage device 14 (FIGURE 1) is a conventional shift register constructed of columns of rows of stages forming an *x–y* coordinate grid. Information corresponding to the "black" and "white" elements of the character area is stored temporarily in the shift register as a result of scanning the character area. Electronic masks are constructed as resistor adders connected to selected outputs of stages or the shift register. In the prior patent, the selected stages correspond as nearly as possible to the precise shape of the character for which the resistor adder (electronic mask) is designed. The resistor adders provide correlation signals reflecting the degree of match between the data temporarily stored in the register pertaining to a scanned character, and each of the electronic masks, there being at least one mask for each possible character that the machine can identify. In such an arrangement as disclosed in Patent No. 3,104,369, it is essential that the data extracted by scanner 10 from the character and stored in register 14 closely match the design of an electronic mask in order to obtain a satisfactory correlation signal. If, for example, an electronic mask were designed such as at 22 (FIGURE 2 herein) and a character such as at 24 (FIGURE 2) were compared thereto, the electronic mask would be only approximately 25% satisfied which is far too small a percentage for reliable character identification. The same is true for a character such as at 26 (FIGURE 2), and the same will be true for "2's" of other fonts, a few of which are shown in FIGURE 3. Yet, each of these characters are perfectly identifiable by a human being, and it is one of the accomplishments of my invention to form an electronic mask in a manner such that the correlation signal provided by it makes little or no distinction when characters such as at 24 or 26 (FIGURE 2) or the "2's" in FIGURE 3 or many others (not shown) are compared thereto. The way I accomplish this is fragmentarily and diagrammatically shown in FIGURE 4.

Figure 2:
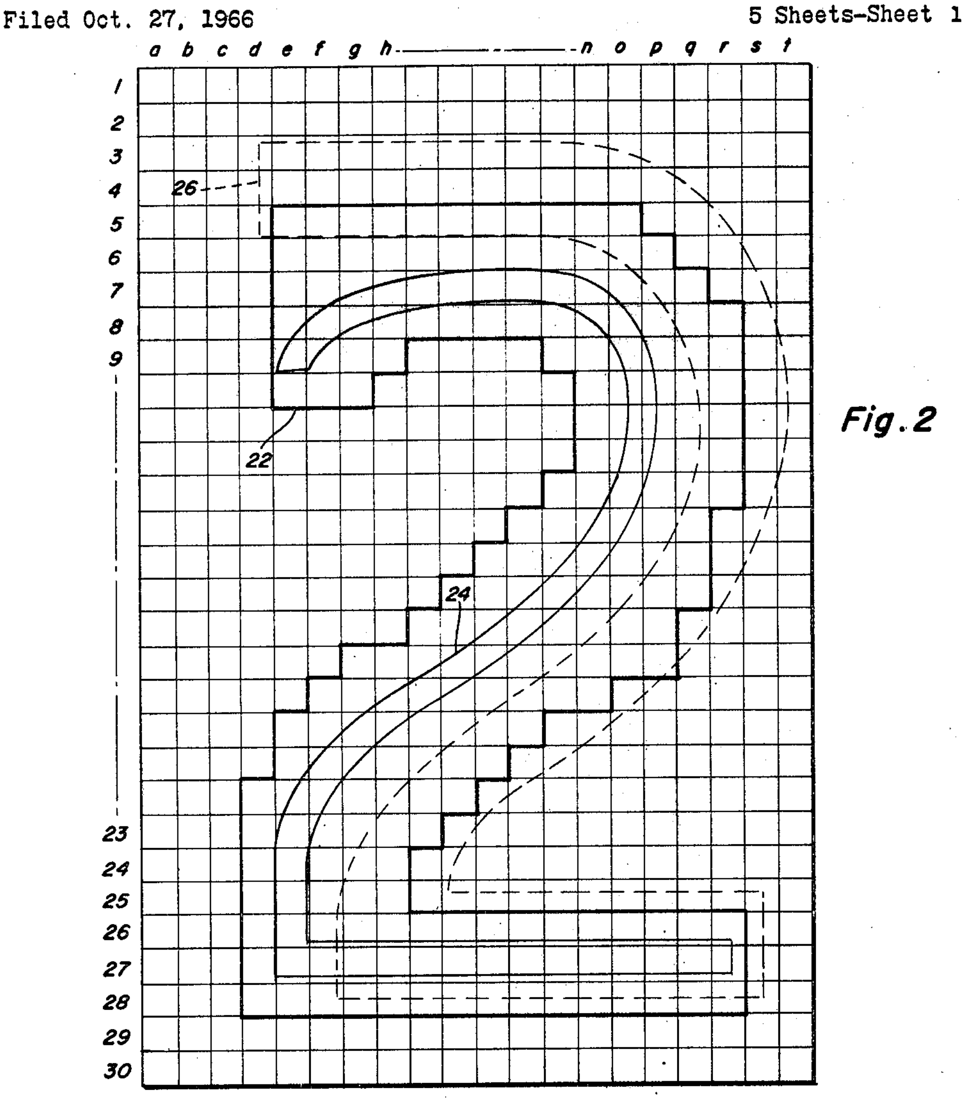
FIGURE 2 is a schematic view showing an electronic mask in a given spatial relationship to an *x–y* coordinate grid, the mask being in heavy lines, there being a full line a dotted line printed character superimposed thereon to show two font variations which satisfy the electronic mask equally, each providing total correlation with the mask although not every point of the mask is satisfied.
Figure 3:
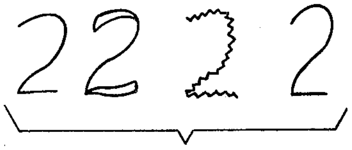
FIGURE 3 shows several characters in different styles which will fit the electronic mask of FIGURE 2 when the characters of FIGURE 3 are enlarged to approximately the grid dimension in FIGURE 2.
Figure 4:
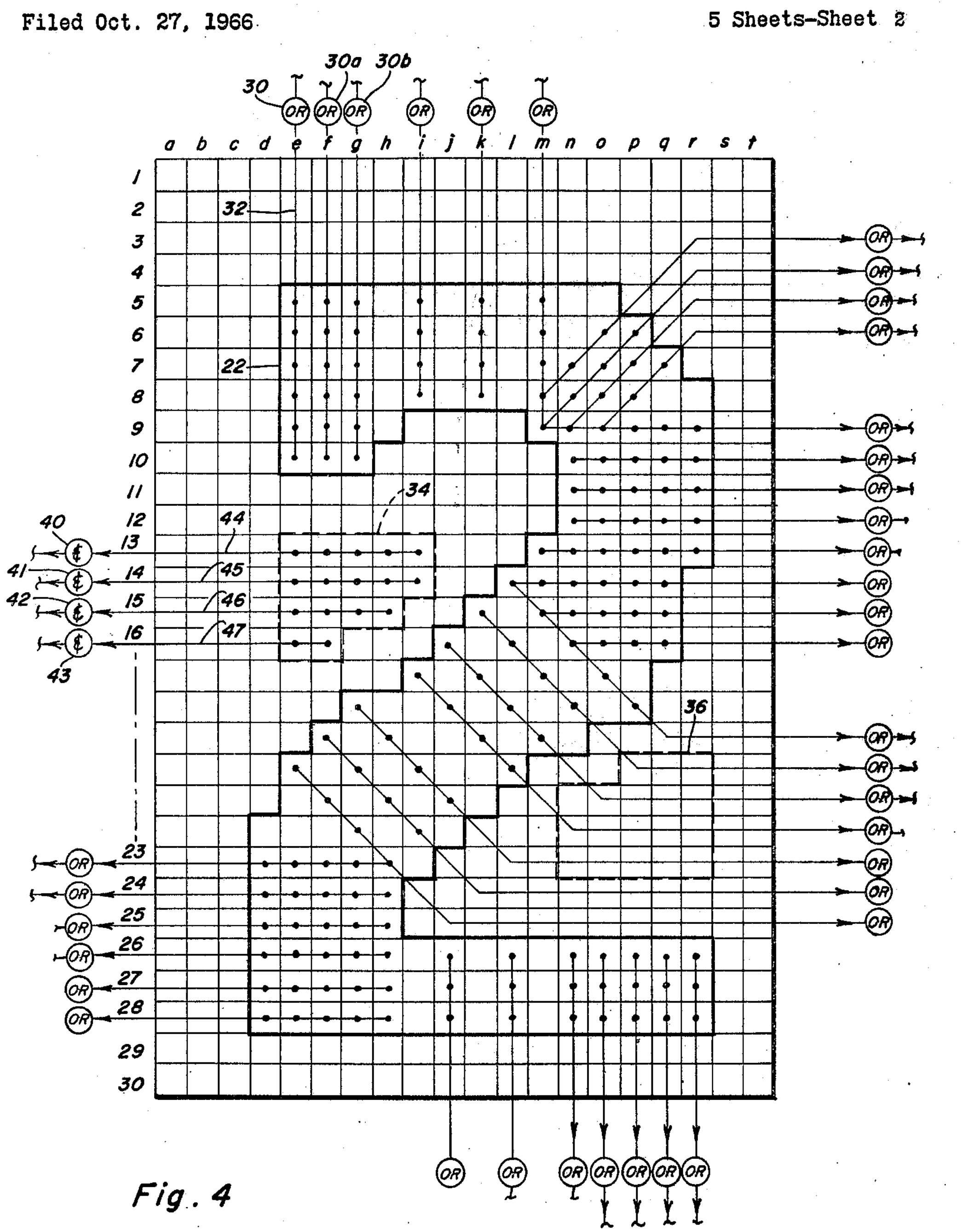
FIGURE 4 is a copy of the electronic mask in FIGURE 2, however, certain of the logic circuits of my invention are schematically shown thereon.

Figure 4 shows the outline at 22 representing an electronic mask identical to that in FIGURE 2. Instead of independently considering each element of the electronic mask as in Patent No. 3,104,369, I have introduced means for logically combining certain of the area elements. An area element corresponds to a shift register stage where the storage device is a conventional shift register as in Patent No. 3,104,369. However, it is stressed that the storage device need not be a shift register. For instance, I may use a mosaic of photocells. In any event, my logical combination of elements has the effect of combining a group of elements, e.g. a group composed of elements 5e–10e in FIGURE 4, in a manner such that if the stored data corresponding to a portion of the character intercepts any single element of the combined group, the output signal resulting from the group is the same as though any number of the same group (or the entire group) stored information pertaining to the character. A simple method of obtaining the logical combination is to use an OR gate for the elements making up the group. More particularly, OR gate 30 at the top of FIGURE 4 has separate inputs on the wires of cable 32, the individual wires being connected to the output terminals of stages 5*e*, 6*e* . . . 10*e* of the shift register. In a like manner each of the other OR gates illustrated in FIGURE 4 has respective groups of inputs conducted over wires of cables with the inputs obtained from selected groups of shift register stages. The illustrated groups of elements are each arranged transversely of the general outline of the character which the electronic mask represents. For example, the electronic mask 22 for the numeral "2" has vertical groupings of elements at the top, diagonal groupings at the right corner of the numeral "2," horizontal groupings immediately therebelow, etc. It is understood that the construction of the electronic mask shown in FIGURE 4 is given by way of example only and that considerable latitude is provided for the designer to select both the number of elements in each group, the number of groups that he desires, the location, and the angular disposition thereof. Furthermore, all of the groups need not be as transverse lines across the mask as illustrated. Two more of the groups may be combined in a single OR gate, and various degrees of concentration may be made in portions of the mask.

The referenced prior patent explains the terms "assertion" and "negation." Briefly, an assertion can be equated to a signal representing a portion of the character, while the negation is the "not" function which represents a portion of the character background or "white." The use of assertions is obvious, while the use of negations is a great help in distinguishing characters which are sub-sets of each other or which are otherwise topologically quite similar. FIGURE 4 shows an area 34 of the electronic mask where negations are used, and it is understood that negations in other portions of the mask can also be used. For example, the area 36 would ordinarily be used in the "2" electronic mask, however, the leads are not brought out in this view for the sole purpose of avoiding complications in the illustration.

While I use OR logic in the groups of assertion elemental areas to accomplish the purpose of making the electronic mask indifferent to font variations, I use AND logic for the negations. By logically combining elements, the signal output from an OR gate is the same regardless of whether or not one or more or all of the inputs to a gate is satisfied by having data representing a portion of the character temporarily stored in the register at the locations of the stages of the group. The AND logic imposes a different requirement on the mask. I have shown AND gates 40, 41, 42 and 43 to the left of FIGURE 4, each having its cable 44, 45, 46 and 47 respectively containing conductors from the grid-identified stages of the register. Thus, for a signal to be provided on the output line 53 of gate 40, the negations of each of the stages 13*e*–13*i* must reflect the storage of "white" (character background) data. The same is true for the three individual groups of stages therebelow associated with AND gates 41, 42 and 43. The effect of the AND logic is to demand that all of the stages of a negation group contain "white" information before a signal is yielded by its associated AND gate. The effect of the assertion OR gate logic is to provide an output from an OR gate when any one or more of the elements in the assertion group experiences a signal representing "black" in the register.

Figures 5, 6:
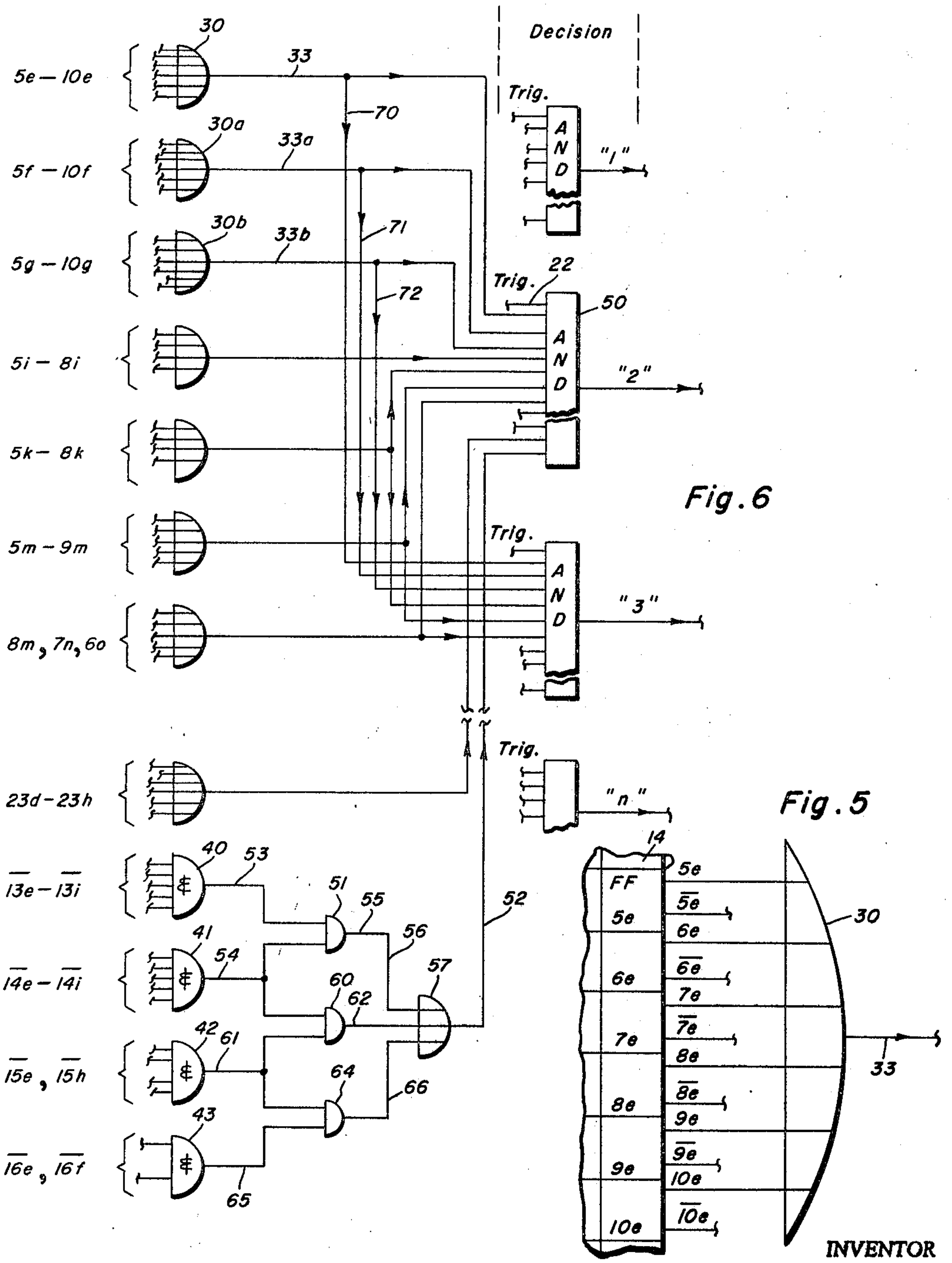
FIGURE 5 is a fragmentary view on enlarged scale showing a portion of a shift register like that in U.S. Patent No. 3,104,369 and further showing one way to design an electronic mask in connection therewith.
FIGURE 6 is a schematic view showing the construction of an electronic mask for the character "2," the mask being termed "2 logic" in this figure.
Figure 8:
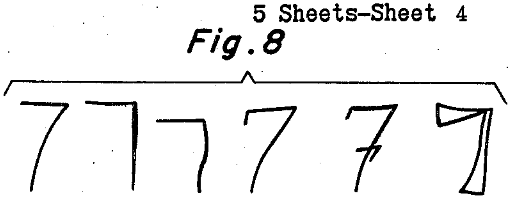
FIGURE 8 is a group of characters in reduced scale, the styles being font variations which will totally correlate with the mask of FIGURE 7.

Attention is now directed to FIGURES 5 and 6 which show how the electronic mask of FIGURE 4 is physically constructed. In FIGURE 5 I have shown stages 5*e*–10*e* of shift register 14, i.e. a fragment of a shift register constructed like the register as shown in the referenced patent. The stages are made of flip-flops, each having a pair of output wires on which assertion and negation signals are conducted. This is represented in FIGURE 5 by the stage number and the not-term of that number. Accordingly, in the design of the electronic mask (FIGURE 6) I have reproduced the OR gates shown in FIGURE 4 and designated the assertion inputs by stage number of the register. For the OR gate 30, the group of inputs are the assertions from stages 5*e*–10*e*, and this is shown in full detail in FIGURE 5 and on enlarged scale. Correlating FIGURE 6 with FIGURE 4, the adjacent OR gate 30*a* has the assertion wires of stages 5*f*–10*f* as inputs, and the single output line 33*a*. Again, correlating FIGURES 4 and 6, the next OR gate 30*b* has assertion input conductors 5*g*–10*g*, and a single output 33*b*. In a like manner all of the OR gates are so arranged, and all of their outputs are combined in an AND gate 50 (FIGURE 6), which is triggered by a trigger signal on line 22 at the proper time.

The negation portion of the electronic mask is constructed of the series of AND gates 40, 41, 42 and 43 whose inputs are as designated in FIGURE 6. The logic network 55 following the group of four AND gates has the effect of requiring any pair of adjacent horizontal groups (FIGURE 4) of elements of the register to be completely satisfied (white) before a signal will be yielded on line 52 (FIGURE 6). A signal on line 52 is necessary for AND gate 50 which is the decision or recognition gate for the character "2," to be satisfied. Logic network 55 is made in the following way. The output lines 53 and 54 from gates 40 and 41 are used as inputs to AND gate 51. The output line 56 of AND gate 51 is connected to OR gate 57 whose output line 52 has been described before. The result of this portion of the logic network described so far is that the two horizontal rows of elements 13*e*–13*i* and 14*e*–14*i* (FIGURE 4) must contain data representing the character background (white) to yield a signal on line 52. However, I mentioned before that any adjacent pair of horizontal groups of negations 34 (FIGURE 4) will suffice to provide a signal on line 52. Accordingly, line 54 (FIGURE 6) which is the output of gate 41, is not only used with coincidence gate 51 but it is also used with coincidence gate 60 whose other input is on line 61. Line 61 is the output line of AND gate 42. The output 62 of coincidence gate 60 is connected as an input to OR gate 57. Thus, it is now perfectly obvious that if gate 41 and 42 are satisfied (stages 14*e*–14*i* and stages 15*e*–15*h* are storing "white" information) there will be a signal on line 52 (FIGURE 6) which is essential to satisfy the "2" recognition gate 50 in the decision section of the machine. In a like manner there is a third coincidence gate 64 having as one input line, 61 which is also common to gate 60, and as the other input, line 65 which is the output of AND gate 43. The output line 66 of coincidence gate 64 is OR gated at 57 to yield a signal on line 52 if (FIGURE 4) stages 15*e*–15*h* and stages 16*e*, 16*f* contain information pertaining to the character background (white information). Had I fully illustrated the negation connections for the negation area 36 (FIGURE 4) the construction would be identical to that described immediately above, and there would be an additional input to AND gate 50 identical to the input line 52.

The preceding description of the construction of the electronic mask 22 relates to a mask for the character "2" in many fonts. It is understood that at least one mask must be constructed for each numeral, letter, or symbol that the machine is expected to identify. While I have not illustrated the details of the necessary additional masks, FIGURE 6 shows AND gates for the characters "1," "3" . . . "*n*." The illustration of a few additional gates permits me to show that many of the OR gates 30, 30*a*, etc. are used in the composition of more than one electronic mask. Thus, I have shown conductors 70, 71, 72

(and others) connected to the output lines of the OR gates and connected as inputs to another of the final decision AND gates. In this instance the conductors 70, 71 and 72 (and others) are connected with the recognition AND gate for the character "3." In a like manner the outputs from these OR gates 30, 30*a*, 30*b* (and others) are used or can be used in the construction of electronic masks for other characters. The same holds true for the negation gates. For instance, the output lines 53 and/or 54 and/or 56 can be used in the construction of the electronic mask for character "3."

FIGURES 7–11

In the embodiment of FIGURES 1–6 the *x–y* coordinate grid of FIGURE 4 was, for explanation purposes, equated to a shift register temporary storage device. In that embodiment the reading machine converted the data extracted by the scanner to digital information. In the embodiment of FIGURES 7–11 there is no temporary storage device such as a shift register, and the reading machine processes the data in analog form.

Figure 7:
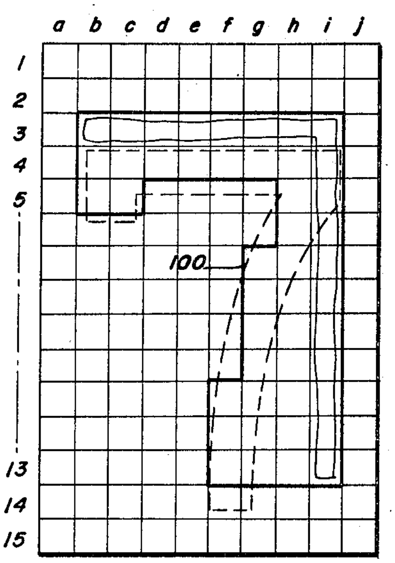
FIGURE 7 is a view showing the outline of an electronic mask for the numeral "7."
Figure 9:
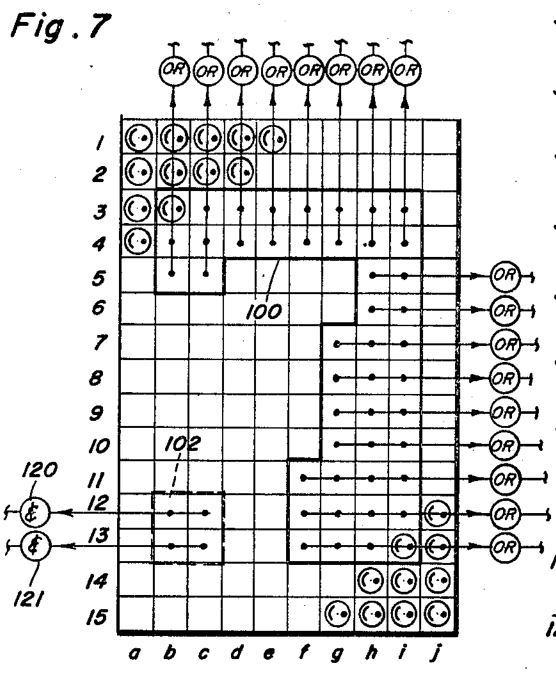
FIGURE 9 is a photocell mosaic scanner having logic means associated therewith to form the electronic mask of FIGURE 7.

FIGURE 7 shows an *x–y* coordinate grid with an electronic mask 100 in heavy outline for the character "7." The coordinate grid corresponds to photocell positions of a mosaic examining device fragmentarily shown in FIGURE 9. Photoelectric examination devices are well known in this art and therefore the details are not discussed herein. The design of the electronic mask 100 is such that the electronic mask is totally satisfied for the numeral "7" in numerous fonts, for instance, the character "7" shown in dotted lines in FIGURE 7 and the character shown in full lines in FIGURE 7 and any of the characters shown in FIGURE 8 and others which are not shown herein. Electronic mask 100 (FIGURE 9) like the mask of FIGURE 4, is formed by connecting selected groups of elements by logical OR gates. The groups are transverse to the lines which the mask represents. Negation area 102 contains groups of elements which are preferably combined by AND logic just as the area 34 of FIGURE 4.

Figure 10:
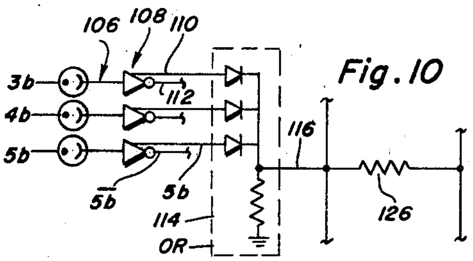
FIGURE 10 is a detail showing the circuits involved in constructing a portion of the mask of FIGURES 7 and 9.

FIGURE 10 shows three of the photocells of the mosaic designated by their grid positions in the photocell mosaic. The three photocells have output lines 106 to conduct electrical signals, transduced from the optical density of the area examined, to inverting amplifiers 108. Each amplifier has an assertion output line 110 and a negation (inverted) output line 112, whereby the assertion or the negation signals originating from each grid position can be selected.

Figure 11:
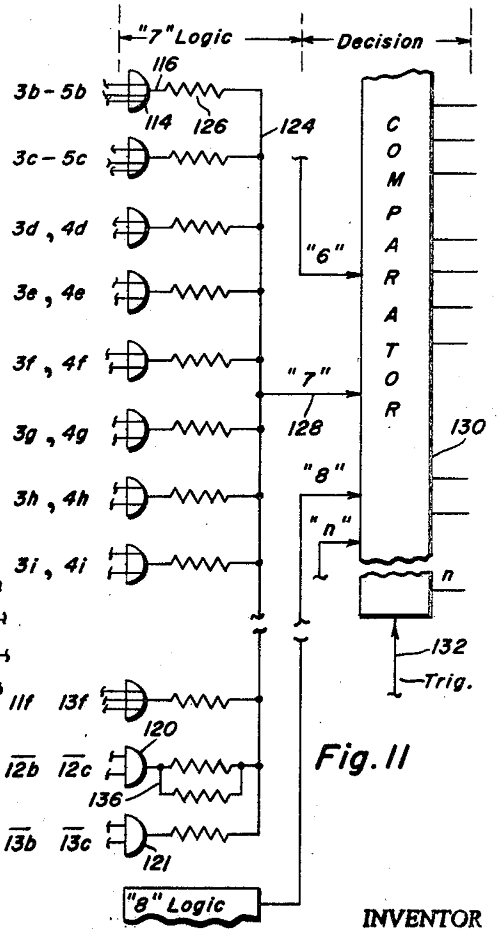
FIGURE 11 is a diagrammatic view showing the "7" logic, i.e. the design of the mask of FIGURE 7 as used in an analog reading machine.

In the construction of the electronic mask (designed "7 logic" in FIGURE 11) the assertion and negation wires connected with the various gates are designated by grid positions in FIGURES 7 and 9. Referring to FIGURE 9, a typical OR gate 114 is shown connected with elements at 3*b*, 4*b* and 5*b* and this is reproduced both in FIGURES 10 and 11. In FIGURE 11 these lines are shown OR gated at 114, while in FIGURE 10 the OR gate is illustrated in detail. A diode OR gate is selected due to its simplicity, and the illustrated configuration will function to select the "best" signal provided on its various input lines. For example, if the "best" signal is the most positive as shown by the polarity of the diodes, and signals of 6 volts, 4 volts and 3 volts are concurrently conducted on lines 110, the output of the gate on line 116 will be 6 volts. Thus, (FIGURE 7) the upper left corner of the full line printed "7" falling at position 3*b* may provide an output signal on line 110 (FIGURE 10) of 6 volts while positions 4*b* and 5*b* are responsible for very little signal, for instance 1 or 2 volts. Under these conditions the signal on line 116 will be 6 volts. Similarly, the signal on line 116 will be 6 volts if all of the elements 3*b*, 4*b* and 5*b* experience darkness sufficient to provide 6 volt signals on all of the lines 110 from these stages.

Considering the negation area 102 (FIGURE 9), I have shown a pair of AND gates 120 and 121 at the lower portion of FIGURE 11. The inputs to these AND gates are the designated negation lines from the amplifier associated with the photocells at the corresponding grid positions. It is entirely possible to connect the output lines from the various gates 114 . . . 121 (FIGURE 11) with ultimate recognition AND gates similar to the AND gate 50 (FIGURE 6) to form the decision section of the machine. However, this would presuppose quantizing or at least multi-level quantizing with the consequent loss of the benefits of a fully analog handling of the information. Therefore, I have shown a resistor adder 124 whose resistors 126 are connected with the various output lines from gates 114 . . . 121. The resistor adder output line 128 is connected to comparator 130 of the decision section of the machine. The comparator is conventional, e.g. as in the referenced patent, and is operated in response to a trigger signal on line 132. In this form of the invention as in the previously described form, it is understood that the gate output lines can be tapped so that the gates are commonly useful for electronic masks representing the other characters which the machine is capable of identifying.

U.S. Patent No. 3,104,369 fully discloses a technique of weighting the signals associated with elemental areas considered important to the recognition of specific characters. In the embodiment of FIGURES 7–11, this technique can be used by altering the resistor values of the resistor adder. This is schematically shown by the paralleled resistors at 136 near the bottom of FIGURE 11.

FIGURE 12

The preceding description explains how electronic masks can be constructed to exhibit an unusual capability to provide high correlation signals for characters of numerous fonts. The description further shows that that it is immaterial whether the machine using my invention is essentially digital or analog in its processing of data. For the most part, the described embodiments have been selected to best disclose the general considerations involved in the invention, and much is left to the designer for selecting permutations of my basic design of an electronic mask. With this in view, attention is directed to FIGURE 12 which shows the construction of a mask for the character "8," using combinations of concepts previously described.

Figures 12, 13:
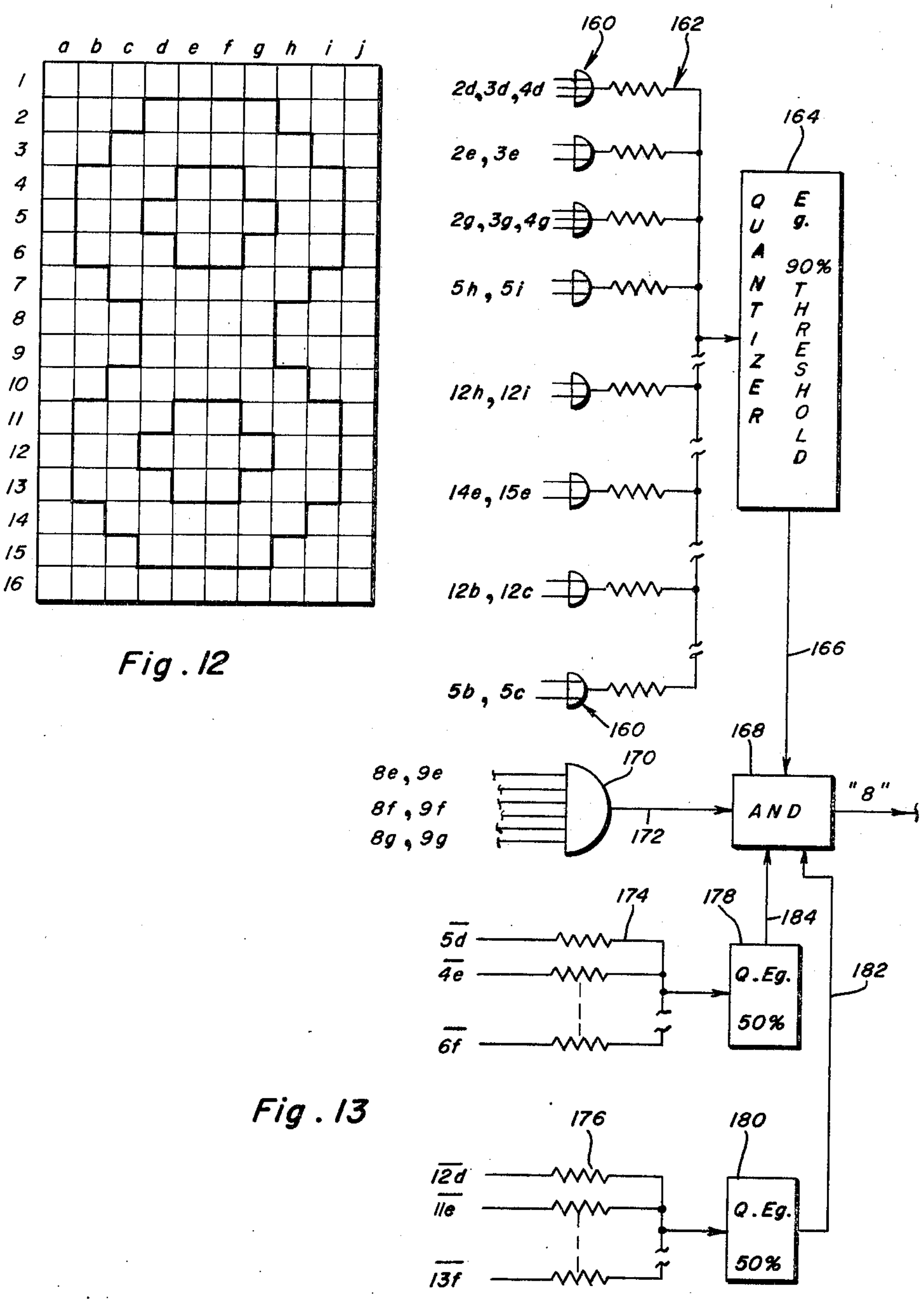
FIGURE 12 is a view showing the outline of an electronic mask for the numeral "8."
FIGURE 13 is a schematic view showing another way to use the invention in a reading machine containing the mask of FIGURE 12.

It can be assumed that the *x–y* grid in FIGURE 12 is a photocell mosaic scanner or a shift register whose stages are identified by the numerical designations 1–16 (rows and alphabetic designations *a–j* (columns). In essence, the electronic mask design is such that an arbitrarily selected percentage of element groups across the character outline must be satisfied. The percentage is selected at 90% for example. Secondly, the central area of the mask is urgently important to distinguish an "8" from an "0." Therefore, the mask design demands the presence of "black" at the central portion of the mask (e.g. elements 8*e*, 9*e*, 8*f*, 9*f*, etc.). Finally, the negation areas, both upper and lower are important, but their locations are not critical, e.g. they can be "up" or "down" slightly. Also, the negation areas ("white") can be large or small. My illustrated mask takes these three considerations into account by the design explained below.

First of all, to establish the transverse groups of elements across the character outline, I use a group of OR gates 160 whose inputs are taken from the selected elements of the shift register (or photocell mosaic amplifiers) as designated by row-column position. The outputs of the group of gates 160 are added by resistor adder 162, and the adder output is used to fire quantizer 164. The threshold of the quantizer is selected (or adjusted) such that a signal corresponding to 90% satisfaction of the element groups (90% of the gates 160 satisfied) is required to fire quantizer 164. The output of the quantizer is conducted on line 166 as an input to gate 168. Gate 168 is for the character "8," and it is understood that there will be one such gate and its electronic mask for each character (1, 2, 3 . . . n) that the machine is designed to identify.

As mentioned before, the central portion of the "8" mask is important in distinguishing a scanned "8" from a "0." Thus, I have AND gate 170 whose inputs are on lines connected to elements *8e*, *9e*, etc. as shown. Alternatively, I could have grouped these elements in short vertical rows by AND gating, or in horizontal rows ahead of AND gate 170. In either case, the output line 172 of gate 170 forms an input of the decision gate 168.

The negation points for the upper expected "white" area are resistively added at 174, and selected negation points for the lower "white" area are added at 176. The two adders are followed by quantizers 178 and 180 whose thresholds are set (or adjusted) to require firing signals corresponding to a percentage (e.g. 50%) of satisfaction of the selected "white" elements. This provides both element and positional tolerance for the "white" areas of the scanned "8."

The output lines 182 and 184 are the final inputs of the decision gate 168, unless a trigger line (read instruction) is used with the gate 168.

It is understood that the preceding is given by way of example only, and that many variations may be made without departing from the protection of the following claims.

I claim:

1. In a character reading machine having means providing first signals and second signals which respectively correspond to the examination and detection of dark and light elements of a character area composed of a coordinate grid of elements, an electronic mask which forms a criterion for a character and with which said signals are compared to identify the character on said character area, said mask provided with a plurality of gates, each gate having a plurality of input conductors adapted to receive first signals originating from adjacent elements of said grid approximately transversely across a first portion of the outline of the character which the mask represents, each gate providing an output when any one of its input conductors conducts a first signal, means to summarize said outputs and to provide a new signal when the summarized outputs reach a threshold value, a coincidence gate having a plurality of input conductors and adapted to receive first signals originating from a second portion of the outline of the character which said mask represents, said coincidence gate providing a second new signal when each of its input conductors conducts a first signal thereto, recognition means on which said first new signal is impressed thereby indicating that a threshold value of first signals are present with respect to said first portion of the character, and said second new signal being impressed on said recognition means thereby indicating that all of said first signals required by said coincidence gate are present with respect to said second portion of the character.

2. The character reading machine of claim 1 and means responsive to a threshold value of second signals originating from elements of said grid at a third portion associated with the character for providing a third new signal, and means for conducting said third new signal to said recognition means.

3. The subject matter of claim 2 wherein said threshold values are established by electrical devices capable of providing said new signals, and the thresholds of the respective devices being different from each other.

4. The subject matter of claim 1 wherein the gates of said groups of gates are logical OR gates, and said summarizing means include a resistive adder followed by a quantizer.

References Cited

UNITED STATES PATENTS

| | | | |
|---|---|---|---|
| 3,104,369 | 9/1963 | Rabinow et al. | 340—146.3 |
| 3,165,717 | 1/1965 | Eckelman et al. | 340—146.3 |
| 3,200,373 | 8/1965 | Rabinow | 340—146.3 |
| 3,289,164 | 11/1966 | Rabinow | 340—146.3 |

MAYNARD R. WILBUR, Primary Examiner
GARY R. EDWARDS, Assistant Examiner